US007432801B2

United States Patent
Verrier et al.

(10) Patent No.: US 7,432,801 B2
(45) Date of Patent: Oct. 7, 2008

(54) SYSTEM AND METHOD FOR DETECTING A RAPID LEAK FROM A TIRE

(75) Inventors: Cyrille Verrier, Pontoise (FR); Regis Leberon, Saint Aubin des Bois (FR)

(73) Assignee: Johnson Controls Automotive Electronics, Cergy Pontoise (FR)

( * ) Notice: Subject to any disclaimer, the term of this patent is extended or adjusted under 35 U.S.C. 154(b) by 156 days.

(21) Appl. No.: 11/156,227

(22) Filed: Jun. 17, 2005

(65) Prior Publication Data

US 2005/0280522 A1   Dec. 22, 2005

(30) Foreign Application Priority Data

Jun. 18, 2004   (FR) .................. 04 06631

(51) Int. Cl.
  B60C 23/00   (2006.01)
  B60C 23/02   (2006.01)
  B60C 19/00   (2006.01)
  B60C 19/08   (2006.01)
  B60Q 1/00    (2006.01)

(52) U.S. Cl. .................. 340/442; 340/443; 340/444; 340/445; 340/446; 340/447; 340/448; 340/449; 73/146.2; 73/146.3; 73/146.4; 73/146.5; 73/146.8; 152/152.1

(58) Field of Classification Search ......... 340/442–449; 73/146.2, 146.3, 146.4, 146.5, 146.8; 152/152.1
See application file for complete search history.

(56) References Cited

U.S. PATENT DOCUMENTS

| 5,900,809 | A  | * | 5/1999  | Hebert ................ 340/442  |
| 5,963,128 | A  | * | 10/1999 | McClelland ............ 340/447  |
| 6,748,797 | B2 | * | 6/2004  | Breed et al. ........... 73/146  |
| 6,868,358 | B2 | * | 3/2005  | Brown, Jr. ............ 702/138  |
| 7,004,019 | B2 | * | 2/2006  | Fischer et al. ......... 73/146  |
| 7,086,276 | B2 | * | 8/2006  | Cook et al. .......... 73/40.5 R |
| 7,242,285 | B2 | * | 7/2007  | Shaw ................. 340/449   |

FOREIGN PATENT DOCUMENTS

FR   2 820 087    8/2002
WO   WO 96/15919  5/1996

OTHER PUBLICATIONS

Search Report by European Patent Office for French Application No. 0406631; dated Feb. 2, 2005; 2 pages.

* cited by examiner

*Primary Examiner*—George A Bugg
*Assistant Examiner*—Lam P Pham
(74) *Attorney, Agent, or Firm*—Foley & Lardner, LLP

(57) ABSTRACT

A method of detecting a rapid leak of gas contained in an automobile tire based on periodic measurements of a pressure Pa and a temperature Ta of the gas. The method includes determining a reference pressure Pcref, calculating an alarm threshold pressure Sref from the reference pressure Pcref, calculating a temperature-compensated pressure Pc at each measurement acquisition period, and comparing the compensated pressure Pc with the alarm threshold pressure Sref, wherein the leak is detected if the compensated pressure Pc is less than the alarm threshold pressure Sref.

17 Claims, 3 Drawing Sheets

Pressure in mbars as a function of speed in Km/h

SYSTEM AND METHOD FOR DETECTING A RAPID LEAK FROM A TIRE

CROSS-REFERENCE TO RELATED APPLICATIONS

This application claims priority to French Patent Application No. 0406631, filed Jun. 18, 2004, incorporated herein by reference in its entirety.

BACKGROUND OF THE INVENTION

The present application is directed to a leak detection system and method, in particular a system and method for detecting rapid leaks such as those occurring when an automobile wheel tire gets a puncture. The rapid detection of punctures is generally of a critical nature, in particular on the motorway.

The detection system and method may be implemented by onboard computers, more specifically in a tire pressure monitoring system (TPMS) module. A TPMS module collects pressure information (P) and temperature information (T) concerning a gas contained in a tire with the aid of sensors and a radio-transmitter, which are generally fixedly attached to the wheel rim. A radio receiver disposed in the module permits a frame of data representative of the pressure and the temperature to be periodically received.

The period of acquiring measurement data frames from each wheel is in principle the inverse of the theoretical transmission frequency of frames by the transmitters which is determined by the onboard computer as a function of an operating state of the vehicle (stopped, running).

To detect a leak, its rate is calculated from the pressure change from one frame to another, at the above-mentioned theoretical frequency, i.e., the rate is calculated from the pressure variation registered over the theoretical time. However, this detection is not optimal since the temperature of the wheel rim, thus of the gas contained in the tire, can vary greatly during vehicle use, for example during braking. This temperature variation causes a variation in the pressure, thus in the calculated rate, which can be erroneously interpreted as a leak, causing false alarms.

Thermal compensation may be used to reduce the effect of the temperature variation. However, thermal compensation, even if it is applied, is not immediately reflected, given the long response time of a temperature sensor, longer than that of a pressure sensor. This problem is further exacerbated by the time between at least two frames which is not constant because 1) it may be voluntarily decreased, for example if the monitoring of the tire pressure needs to be increased, in which case the calculated rate decreases with the time between two frames, or 2) it may increase automatically if a frame is lost due to a poor radio link. The calculated rate can thus easily double.

Owing to its critical nature, a rapid leak such as a puncture must be detected as quickly as possible, which excludes the use of filtering techniques even though the precision of the sensors used would prompt such a use.

This is the reason why it is generally preferred to use methods solely based on the differential analysis of pressure variations (or rates) of the set of tires, or at least of those of the wheels of each of the axle systems of the vehicle, which has the advantage of obviating the use of temperature sensors, of initial tire pressures (at ignition) and of the use of filtering. However false alarms, mentioned above, remain possible.

Accordingly, there is a need for a solution to obviate as much as possible this risk of false alarms.

SUMMARY OF THE INVENTION

One embodiment of the invention relates to a method of detecting a rapid leak of gas contained in an automobile tire based on periodic measurements of a pressure Pa and a temperature Ta of the gas. The method includes determining a reference pressure Pcref, calculating an alarm threshold pressure Sref from the reference pressure Pcref, calculating a temperature-compensated pressure Pc at each measurement acquisition period, and comparing the compensated pressure Pc with the alarm threshold pressure Sref, wherein the leak is detected if the compensated pressure Pc is less than the alarm threshold pressure Sref.

Another embodiment of the invention relates to a system for detecting a rapid leak of gas contained in an automobile tire based on periodic measurements of a pressure Pa and a temperature Ta of the gas. The system includes a tire pressure monitoring system configured to transmit temperature information and pressure information. The system further includes a leak detection computing system configured to receive the temperature information and pressure information, determine a reference pressure Pcref and calculate an alarm threshold pressure Sref from the reference pressure Pcref, calculate a temperature-compensated pressure Pc at each measurement acquisition period, and compare the compensated pressure Pc with the alarm threshold pressure Sref, wherein the leak is detected if the compensated pressure Pc is less than the alarm threshold pressure Sref.

Yet another embodiment of the invention relates to a program product for detecting a rapid leak of gas contained in an automobile tire based on periodic measurements of a pressure Pa and a temperature Ta of the gas. The program product includes machine-readable program code for causing, when executed, one or more machines to perform a series of method steps. The method include determining a reference pressure Pcref, calculating an alarm threshold pressure Sref from the reference pressure Pcref, calculating a temperature-compensated pressure Pc at each measurement acquisition period, and comparing the compensated pressure Pc with the alarm threshold pressure Sref, wherein the leak is detected if the compensated pressure Pc is less than the alarm threshold pressure Sref.

Alternative examples of other exemplary embodiments are also provided which relate to other features and combinations of features as may be generally recited in the claims.

BRIEF DESCRIPTION OF THE DRAWINGS

The invention will be better understood with the aid of the following description of the method in accordance with the invention, with reference to the accompanying drawing, in which.

DETAILED DESCRIPTION OF THE PREFERRED EMBODIMENTS

The present application relates to a method of detecting a rapid leak of gas contained in an automobile tire based on periodic measurements of the pressure and temperature of said gas, having the following steps:

a reference pressure is calculated, an alarm threshold pressure is calculated from said reference pressure, a temperature-compensated pressure is calculated at each measurement acquisition period, said compensated pressure is compared with the alarm threshold pressure, and the rapid leak is detected if the compensated pressure is less than the alarm threshold pressure.

Thus, the inconveniences associated with filtering over several frames, with pressure jumps owing to temperature variations, to volume variations, with the sensor sensitivity, etc. are obviated.

Preferably, the reference pressure is measured in the cold state and is temperature-compensated. Thus, the inconveniences associated with detection errors owing to initial pressure variations are obviated. In a further preferential manner, the reference pressure is measured either after a predetermined time, for example at least one hour after the last stop, or at the time of ignition of the vehicle, and the alarm threshold pressure is determined as a function of a safety threshold which depends upon the precision of the measurement sensors.

Detection may possibly be invalidated when a following acquisition period is calculated so as to eliminate the possible effect of the time constant of the temperature sensor.

It will be noted that by effecting detection on each wheel, at each acquisition period of the pressure and temperature measurements, by comparing a temperature-compensated pressure with an alarm threshold, updated at each ignition, the risk of false alarms is reduced.

Hereinafter, the temperature-compensated pressure Pc is intended to mean the magnitude which results from the calculation:

$$Pc = Pa \times T_{20}/Ta, \quad (1)$$

where Ta is the absolute temperature of the gas contained in the tire corresponding to the pressure Pa, a pressure which is designated herein as absolute pressure, i.e., not temperature-compensated. Ta and Pa are measured periodically by the TPMS of the vehicle, as mentioned above.

In formula (1), the temperatures and pressures are expressed in Kelvin and in millibars respectively, $T_{20}$ being the reference Kelvin temperature, for example 20° C. Nonetheless, in the graphs of the Figures, the temperatures are expressed in degrees Celsius.

Figure 1A:
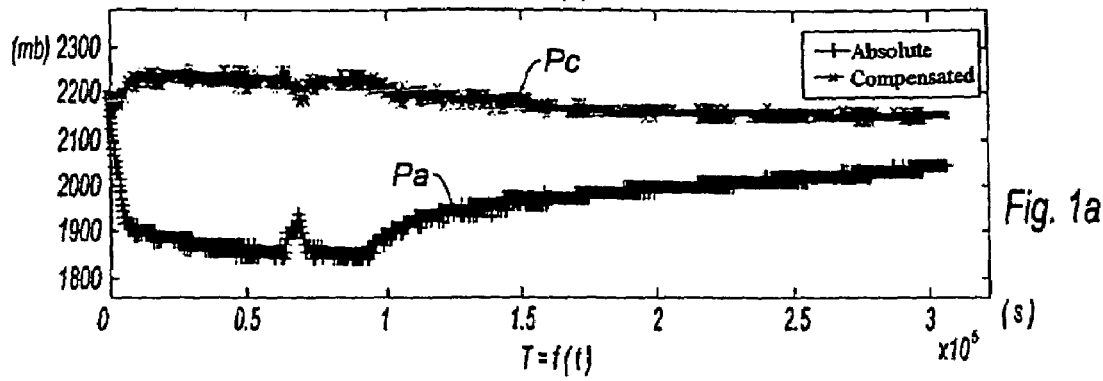
FIGS. 1a, 1b, 1c, 1d are graphs showing the compared curves of pressure measurements, compensated or not, and temperature measurements as a function of time during vehicle use.
Figure 1B:
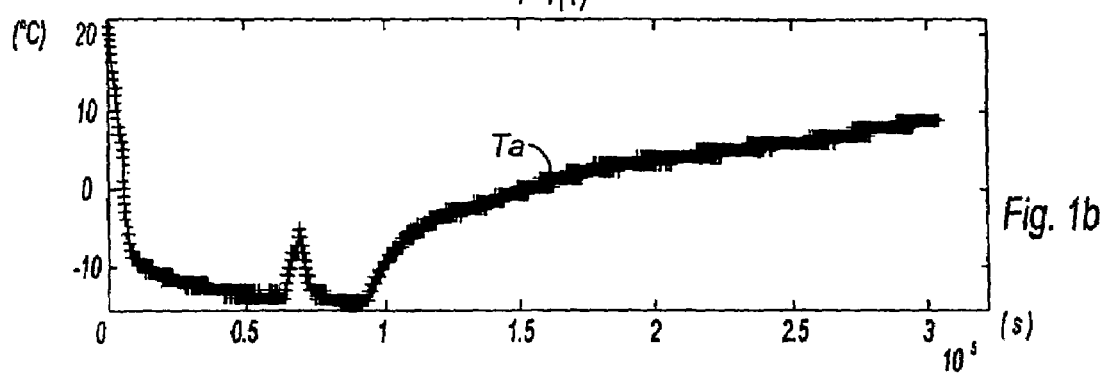

FIGS. 1a and 1b respectively show an exemplary time curve of the absolute pressure Pa and the compensated pressure Pc of the gas of a vehicle wheel tire during vehicle use, and the parallel curve of its temperature Ta. In this example, the temperatures vary between 20° C. and −15° C. The relative stability of Pc, whose variation is less than 50 millibars, should be noted. In contrast thereto, Pa is greatly influenced by the temperature Ta.

Figure 1C:
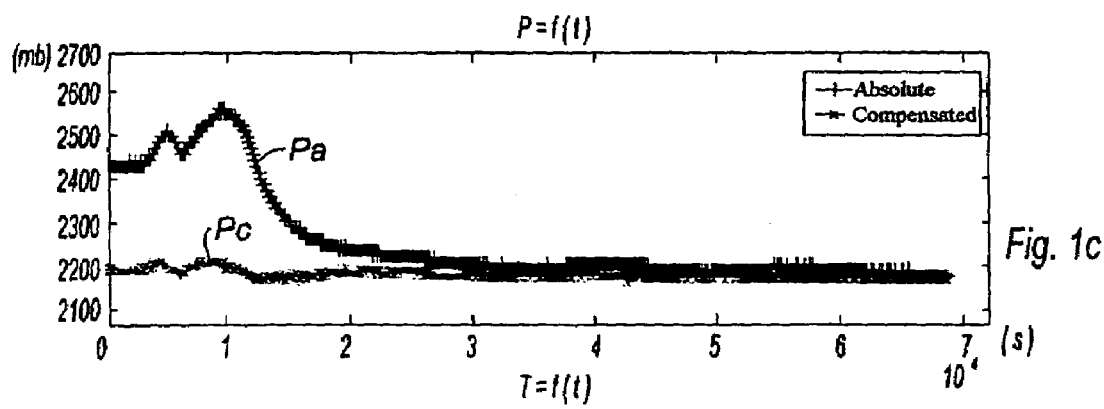
Figure 1D:
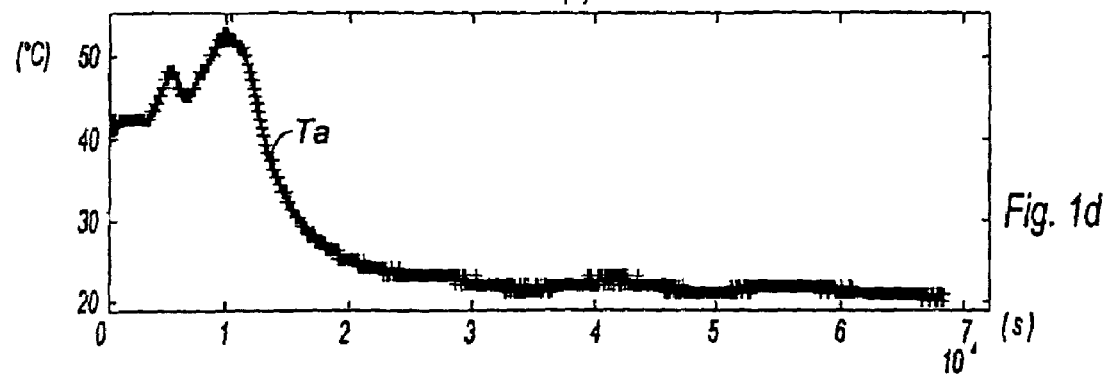

This is also true for another example of corresponding curves of the temperature Ta and the pressures Pa and Pc in FIGS. 1c and 1d. The temperature Ta varies between 20° C. and 55° C. during the vehicle use. It will be understood that it is difficult to monitor the direct measurement of the pressure Pa which is not temperature-compensated.

Figure 2A:
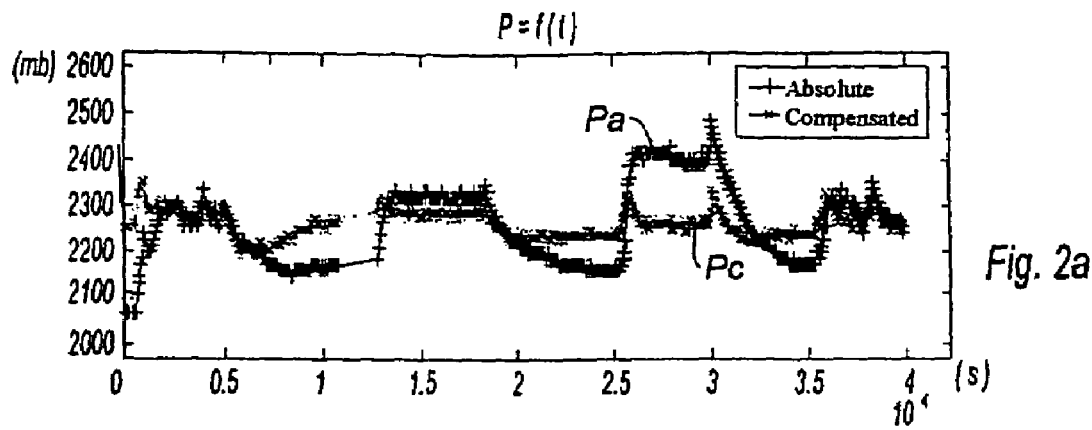
FIGS. 2a, 2b, 2c are graphs showing the compared curves of pressure measurements, compensated or not, temperature measurements and linear running speed measurements as a function of time during vehicle use.
Figure 2B:
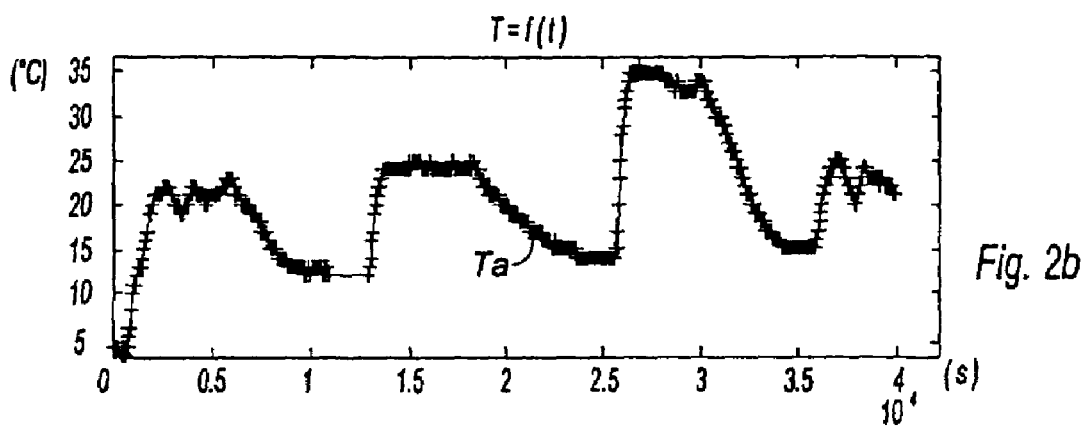
Figure 2C:
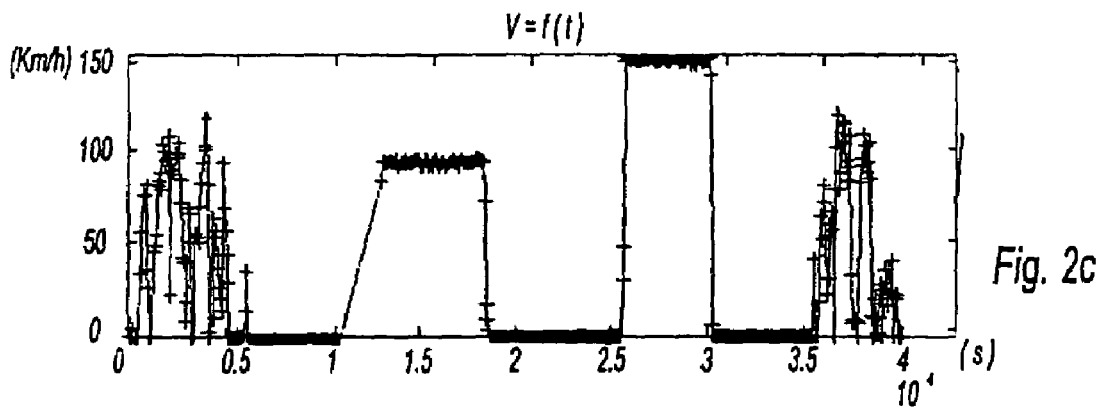

Referring now to FIG. 2a, a third exemplary time curve of the absolute pressure Pa and compensated pressure Pc is shown. FIG. 2b shows the parallel curve of the temperature Ta of the gas of the tire for the same example. FIG. 2c further shows the parallel curve of the speed of the vehicle for this example. In this example, the temperatures vary between 0° C. and 35° C. It will be noted that Pa is greatly influenced by the speed of the vehicle across the temperature Ta and that Pc remains more stable.

Figure 3:
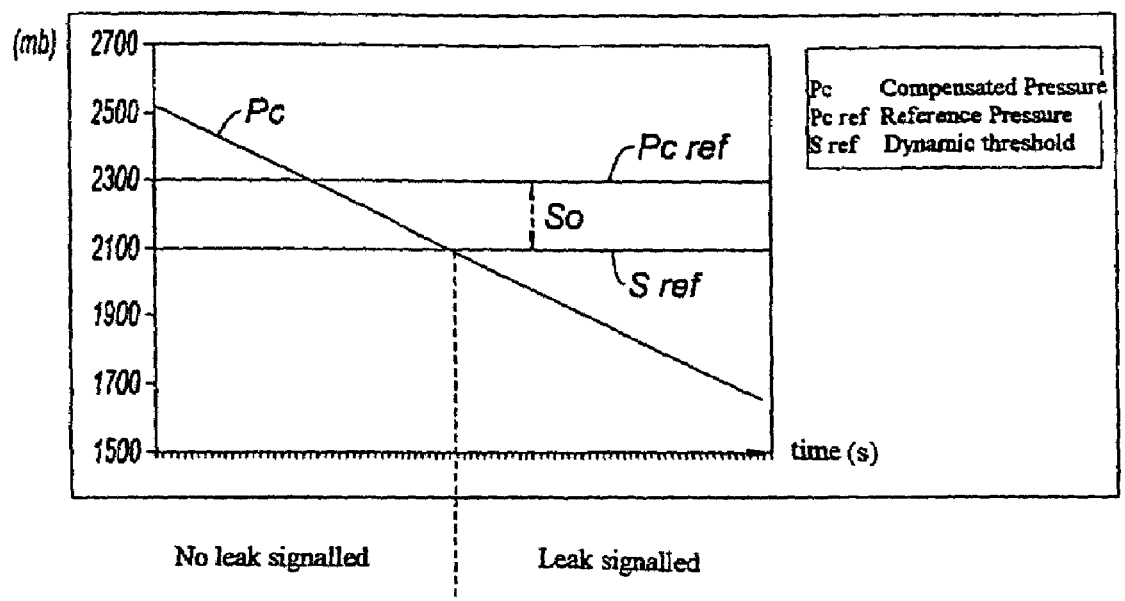
FIG. 3 is a graph showing the curve of the compensated pressure during a rapid leak, and the comparison effected to detect said leak in accordance with the method of the invention.

Owing to these noted properties, with reference to FIG. 3, the method for detecting a rapid leak from the tire of the vehicle consists in this example, based on the periodic measurements of the pressure and temperature of the gas, of effecting the following steps:

a reference pressure $Pc_{ref}$ is calculated from a first measurement $Pa_{ref}$ measured in the cold state, for example at least one hour after the last stop, or at the time of ignition of the vehicle, from the tire pressure and from the corresponding tire temperature $Ta_{ref}$ in accordance with formula (1), an alarm threshold pressure Sref is calculated from said reference pressure Pcref in accordance with the following formula:

$$S_{ref} = Pc_{ref} - So, \quad (2)$$

where So is a constant safety threshold but can also be a parameter calculated as a function of the elements mentioned hereinafter, at each acquisition period, a temperature-compensated pressure Pc is calculated in accordance with formula (1), said compensated pressure Pc is compared with the alarm threshold Sref, and the leak is detected if the compensated pressure Pc is less than the alarm threshold pressure Sref.

The safety threshold So is calibrated as a function of the precision of the pressure and temperature sensors used, and also of the response time of the temperature sensor over a measurement acquisition period. A threshold So which is at least greater than 5% of the nominal pressure of the tire must be provided. A value of 10%, i.e., about 200 millibars in the example of the Figures, is particularly suitable. In an advantageous manner, a value between 2 and 25% may be chosen, preferably between 10 and 15%.

Accordingly, the present application further relates to a method of detecting a rapid leak of gas contained in an automobile tire based on periodic measurements of the pressure Pa and temperature Ta of said gas, having the following steps:

a reference pressure $Pc_{ref}$ is calculated, an alarm threshold pressure $S_{ref}$ is calculated from said reference pressure Pcref, a temperature-compensated pressure Pc is calculated at each measurement acquisition period, said compensated pressure Pc is compared with the alarm threshold pressure $S_{ref}$, the leak is detected if the compensated pressure Pc is less than the alarm threshold pressure $S_{ref}$.

Thus, the inconveniences mentioned above and the detection errors owing to initial pressure variations are obviated.

Detection may possibly be invalidated when a following acquisition period is calculated so as to eliminate the residual effect of the time constant of the temperature sensor, however the chosen threshold So ensures a statistically defined diagnostic safety which eliminates this possibility.

It will be noted that by effecting detection by comparing the value of the same pressure at each acquisition period with an alarm threshold updated at each ignition, all of the inconveniences consisting of calculating a rate are obviated.

It may be noted that although the description provided herein illustrates a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and logic to accomplish the various database searching steps, correlation steps, comparison steps and decision steps. It may also be noted that the word "computing system" as used herein and in the claims is intended to encompass implementations using one or more lines of software code, and/or hardware implementations, and/or equipment for receiving manual inputs.

Embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which ca be used to carry or stored desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods described herein. The particular sequence of such executable instructions or associated data structures represent examples of corresponding acts for implementing the functions described in such steps.

While the detailed drawings, specific examples, and particular formulations given described preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communication bus or processor used may differ. The systems and methods depicted and described are not limited to the precise details and conditions disclosed. Furthermore, other substitutions, modifications, changes, and omissions may be made in the design, operating conditions, and arrangement of the exemplary embodiment without departing from the scope of the invention as expressed in the appended claims.

What is claimed is:

1. A method of detecting a rapid leak of gas contained in an automobile tire based on periodic measurements of a pressure Pa and a temperature Ta of the gas, the method comprising:
   determining a reference pressure Pcref;
   calibrating a safety threshold So as a function of the precision of a pressure sensor used to measure pressure Pa, the precision of a temperature sensor used to measure temperature Ta, and the response time of the temperature sensor over each measurement acquisition period;
   calculating an alarm threshold pressure Sref from the reference pressure Pcref, wherein the alarm threshold pressure Sref is determined as a function of the safety threshold So;
   calculating a temperature-compensated pressure Pc at each measurement acquisition period; and
   comparing the compensated pressure Pc with the alarm threshold pressure Sref, wherein the leak is detected if the compensated pressure Pc is less than the alarm threshold pressure Sref.

2. The method as claimed in claim 1, wherein the reference pressure Pcref is measured in a cold state and is temperature-compensated.

3. The method as claimed in claim 2, wherein the compensated pressure is calculated in accordance with a formula Pc=Pa*T20/Ta, wherein T20 is a reference Kelvin temperature.

4. The method as claimed in claim 1, wherein the reference pressure Pcref is measured at at least one of a predetermined time after a last stop and at a time of ignition of a vehicle including the tire.

5. The method as claimed in claim 1, wherein the safety threshold So ranges between 2% and 25% of a nominal pressure of the tires.

6. The method as claimed in claim 1, wherein the alarm threshold pressure is calculated in accordance with a formula Sref=Pcref−So.

7. A system for detecting a rapid leak of gas contained in an automobile tire based on periodic measurements of a pressure Pa and a temperature Ta of the gas, the system comprising:
   a tire pressure monitoring system configured to transmit temperature information and pressure information; and
   a leak detection computing system configured to;
      calibrate a safety threshold So as a function of the precision of a pressure sensor used to measure pressure Pa, the precision of a temperature sensor used to measure temperature Ta, and the response time of the temperature sensor over each measurement acciuisition period;
      receive the temperature information and pressure information;
      determine a reference pressure Pcref and calculate an alarm threshold pressure Sref from the reference pressure Pcref, wherein the alarm threshold pressure Sref is determined as a function of the safety threshold,
      calculate a temperature-compensated pressure Pc at each measurement acquisition period, and compare the compensated pressure Pc with the alarm threshold pressure Sref, wherein the leak is detected if the compensated pressure Pc is less than the alarm threshold pressure Sref.

8. The system as claimed in claim 7, wherein the reference pressure Pcref is measured in a cold state and is temperature-compensated.

9. The system as claimed in claim 8, wherein the compensated pressure Pc is calculated in accordance with a formula Pc=Pa*T20/Ta, wherein T20 is a reference Kelvin temperature.

10. The system as claimed in claim 7, wherein the reference pressure Pcref is measured at at least one of a predetermined time after a last stop and at a time of ignition of a vehicle including the tire.

11. The system as claimed in claim 7, wherein the safety threshold So ranges between 2% and 25% of a nominal pressure of the tires.

12. The system as claimed in claim 7, wherein the alarm threshold pressure is calculated in accordance with a formula Sref=Pcref−So.

13. A program product for detecting a rapid leak of gas contained in an automobile tire based on periodic measurements of a pressure Pa and a temperature Ta of the gas, comprising machine-readable program code for causing, when executed, one or more machines to perform the following method steps, the method comprising:

determining a reference pressure;

calibrating a safety threshold as a functions of the precision of a pressure sensor used to measure pressure Pa, the precision of a temperature sensor used to measure temperature Ta, and the response time of the temperature sensor over each measurement acquisition period;

calculating an alarm threshold pressure from the reference pressure Pcref, wherein the alarm threshold pressure is determined as a function of the safety threshold;

calculating a temperature-compensated pressure at each measurement acquisition period; and comparing the temperature-compensated pressure with the alarm threshold pressure, wherein the leak is detected if the temperature-compensated pressure is less than the alarm threshold pressure.

14. The system as claimed in claim 13, wherein the reference pressure is measured in a cold state and is temperature-compensated.

15. The system as claimed in claim 14, wherein the compensated pressure is calculated in accordance with temperature-compensated pressure equal to an absolute pressure times a reference Kelvin temperature divided by absolute temperature of the gas in the tire.

16. The system as claimed in claim 13, wherein the reference pressure is measured at at least one of a predetermined time after a last stop or at a time of ignition of a vehicle including the tire.

17. The system as claimed in claim 13, wherein the alarm threshold pressure is calculated in accordance with a formula Sref=Pcref−So.

* * * * *

UNITED STATES PATENT AND TRADEMARK OFFICE
CERTIFICATE OF CORRECTION

| | | |
|---|---|---|
| PATENT NO. | : 7,432,801 B2 | Page 1 of 1 |
| APPLICATION NO. | : 11/156227 | |
| DATED | : October 7, 2008 | |
| INVENTOR(S) | : Cyrille Verrier | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 267 days.

Signed and Sealed this

Twenty-eighth Day of September, 2010

David J. Kappos
*Director of the United States Patent and Trademark Office*